(12) United States Patent
Holloway

(10) Patent No.: US 10,659,734 B2
(45) Date of Patent: May 19, 2020

(54) HANDHELD COMMUNICATIONS DEVICES AND COMMUNICATIONS METHODS

(75) Inventor: Timothy D. Holloway, Libertyville, IL (US)

(73) Assignee: IDEAL Industries, Inc., Sycamore, IL (US)

( * ) Notice: Subject to any disclaimer, the term of this patent is extended or adjusted under 35 U.S.C. 154(b) by 841 days.

(21) Appl. No.: 12/493,477

(22) Filed: Jun. 29, 2009

(65) Prior Publication Data
US 2010/0328458 A1    Dec. 30, 2010

(51) Int. Cl.
| | | |
|---|---|---|
| H04N 7/18 | (2006.01) | |
| H04L 12/24 | (2006.01) | |
| H04L 29/08 | (2006.01) | |
| H04L 29/06 | (2006.01) | |

(52) U.S. Cl.
CPC .......... *H04N 7/18* (2013.01); *H04L 41/0803* (2013.01); *H04L 67/04* (2013.01); *H04L 69/22* (2013.01)

(58) Field of Classification Search
CPC ..... H04L 41/0803; H04L 67/04; H04L 69/22; H04N 7/18
See application file for complete search history.

(56) References Cited

U.S. PATENT DOCUMENTS

| | | | | |
|---|---|---|---|---|
| 5,708,654 A | * | 1/1998 | Arndt | H04L 29/12009 370/242 |
| 5,724,510 A | * | 3/1998 | Arndt | H04L 29/12018 370/252 |
| 6,092,078 A | * | 7/2000 | Adolfsson | |
| 6,578,167 B2 | | 6/2003 | Boorom et al. | |
| 6,601,093 B1 | * | 7/2003 | Peters | H04L 29/12113 709/220 |
| 6,628,325 B1 | | 9/2003 | Steinberg et al. | |
| 6,826,611 B1 | * | 11/2004 | Arndt | H04L 29/12216 370/252 |
| 7,035,915 B1 | * | 4/2006 | Huo | H04L 29/1232 370/254 |
| 7,106,726 B2 | | 9/2006 | Vaziri et al. | |
| 7,152,099 B1 | * | 12/2006 | Arens | H04L 29/12235 709/220 |

(Continued)

OTHER PUBLICATIONS

Manual01: Fluke networks NetTool inline network tester users Manual, published 2005.*

(Continued)

*Primary Examiner* — Mohammed S Rahaman
(74) *Attorney, Agent, or Firm* — Greenberg Traurig, LLP (57) ABSTRACT

Handheld communications devices include a communications port, at least one battery, and processing circuitry configured to automatically determine a network address of a network node connected to the communications port, to communicate with the network node using the determined network address, and to consume energy stored by the battery. Communications methods include using a handheld communications device connected to a network node, automatically determining a network address of the network node; using the handheld communications device, communicating with the network node using the determined network address; and based on the communicating and using the handheld communications device, verifying that the network node is operational.

2 Claims, 5 Drawing Sheets

(56) References Cited

U.S. PATENT DOCUMENTS

| | | | |
|---|---|---|---|
| 7,281,036 B1 * | 10/2007 | Lu | H04L 29/12028 709/220 |
| 7,453,886 B1 * | 11/2008 | Allan | 370/395.5 |
| 7,487,253 B1 * | 2/2009 | Storm | H04L 29/12216 370/389 |
| 7,627,398 B1 * | 12/2009 | Bennett | H04L 12/10 700/286 |
| 7,702,732 B1 * | 4/2010 | Squire | H04L 41/084 709/206 |
| 2003/0204611 A1 | 10/2003 | McCosh et al. | |
| 2004/0017814 A1 * | 1/2004 | Shimada | H04L 29/1232 370/395.52 |
| 2004/0030810 A1 | 2/2004 | Lozano | |
| 2005/0222815 A1 * | 10/2005 | Tolly | H04L 43/50 702/185 |
| 2007/0002143 A1 * | 1/2007 | Elberbaum | 348/188 |
| 2007/0132850 A1 * | 6/2007 | Seo | 348/180 |
| 2007/0280274 A1 * | 12/2007 | Haraguchi | H04L 29/12028 370/401 |
| 2009/0046590 A1 | 2/2009 | Boyes et al. | |

OTHER PUBLICATIONS

PingProcess01: "How Ping Works" published on http://www.inetdaemon.com/.*

* cited by examiner

HANDHELD COMMUNICATIONS DEVICES AND COMMUNICATIONS METHODS

TECHNICAL FIELD

The present invention, in various embodiments, relates to handheld communications devices and communications methods.

BACKGROUND OF THE INVENTION

The use of known video cameras for surveillance is widespread. Such known video cameras may transmit analog and/or digital video signals to a monitoring station or video recording device via dedicated cables running between the known video cameras and the monitoring station or video recording device. Methods of installing and testing known video cameras are well known and are practiced by a large number of installers. These installers are typically adept at running cables, physically connecting the cables to video cameras and other equipment, adjusting camera settings, and verifying proper operation of the known video cameras.

Recently, the use of video cameras that transmit packets containing bits representing a portion of a video signal has become popular. These video cameras may be connected to data networks, such as Ethernet and/or Internet Protocol (IP) data networks, and may be referred to as IP video cameras or IP cameras. In some cases, such networks may use a shared infrastructure to relay data packets generated by many different IP video cameras.

Those who install and test such IP video cameras may use a set of skills that is different from the set of skills used to install and test known video cameras. For example, installing and testing IP video cameras may involve understanding how data networks operate including the addressing of nodes of the data network. In many cases, those who install known video cameras do not have the skill set used for installing and testing IP video cameras.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

At least some aspects of the present disclosure are directed towards handheld communications devices and communications methods. In some embodiments described herein, a handheld communications device is used to verify that a network node is operational by communicating with the network node and/or observing communications of the network node. The network node may be a device connected to a packet network (e.g., an Ethernet and/or IP network). Examples of network nodes include IP video cameras and IP telephones, although other devices connected to a network that transmit and receive packets may also be considered network nodes.

Figure 1:
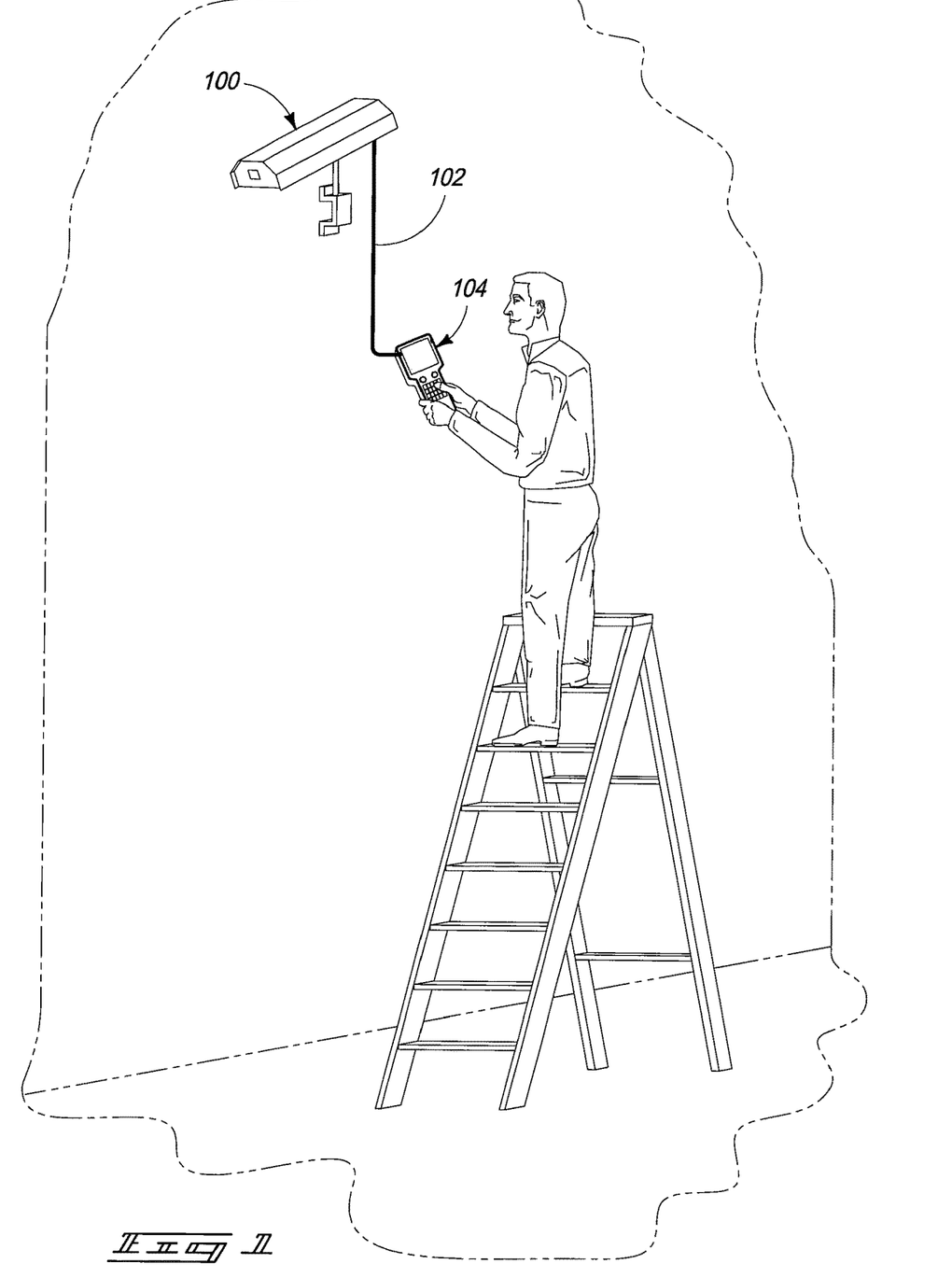
FIG. 1 is a perspective view illustrating the use of a handheld communications device according to one embodiment.

Referring to FIG. 1, an IP video camera 100 is illustrated. IP camera 100 is one example of a network node. IP camera 100 may be configured to capture video images of a particular physical area. In some cases, IP camera 100 may be adjusted so that IP camera 100 is able to capture video images of a plurality of different physical areas. For example, IP camera 100 may be able to pan, tilt, and/or zoom in order to capture images of different physical areas.

As depicted in FIG. 1, IP camera 100 is mounted in a desired position on a wall and an installer is using a handheld communications device 104 to verify that IP camera 100 is operational. Handheld communications device 104 is connected to IP camera 100 via cable 102. Cable 102 may be configured to relay data packets. In one embodiment, cable 102 may be a Category 5 cable configured to relay Ethernet data packets between IP camera 100 and handheld communications device 104.

In one embodiment, IP camera 100 may be installed prior to using handheld communications device 104 to verify that IP camera 100 is operational. As a result, IP camera may be located such that a user of handheld communications device 104 may need to use a ladder to reach IP camera 100. To facilitate use of handheld communications device 104 while standing on a ladder, handheld communications device 104 may be compact, lightweight, and battery powered. Furthermore, in some embodiments, handheld communications device 104 may be configured so that a user may view and/or operate handheld communications device 104 without having to hold handheld communications device 104 with one or more hands. For example, handheld communications device 104 may include straps that couple handheld communications device 104 to the user's body.

According to one aspect of the invention, a handheld communications device includes a communications port, at least one battery, and processing circuitry. The communications port may be an Ethernet port and the communications port may be configured to consume the energy stored by the battery in providing power via the communications port to the network node.

The processing circuitry is configured to automatically determine a network address of a network node connected to the communications port, to communicate with the network node using the determined network address, and to consume energy stored by the battery.

In one embodiment, the network node may be referred to as a first network node, the communications port may be referred to as a first communications port, and the handheld communications device may further include a second communications port. In this embodiment, the first and second communications ports may be Ethernet ports and the handheld communications device may further include an Internet Protocol interface.

The processing circuitry may be further configured to form a first packet comprising an IP address of the IP interface, transmit the first packet to the first network node via the first communications port, form a second packet comprising the IP address, and transmit the second packet to a second network node connected to the second communications port.

According to another aspect of the invention, a communications method includes using a handheld communications device connected to a network node to: automatically determine a network address of the network node; communicate with the network node using the determined network address, and based on the communicating, verify that the network node is operational. Verifying that the network node is operational may include retrieving, from the network node, information captured by the network node or information describing a configuration of the network node. In one configuration, the network node may include an IP camera and the captured information may include images captured by the IP camera. The verifying may additionally or alternatively include retrieving information from a web server of the network node from the network node.

Determining the network address of the network node may include receiving a packet comprising the network address from the network node. The network address may be unknown to the handheld communications device prior to the handheld communications device determining the network address.

The method may include prior to the communicating with the network node, modifying a network address of the handheld communications device based on the determining of the network address of the network node so that the network address of the handheld communications device and the network address of the network node belong to a same IP subnet.

Prior to the determining of the network address, the network address of the network node and the network address of the handheld communications device may belong to different IP subnets relative to one another. Furthermore, the network address of the network node and the network address of the handheld communications device may both be IP addresses.

The handheld communications device may be connected to the network node via a cable, the handheld communications device may be battery powered, and communicating with the network node may include communicating via the cable.

The method may include providing power to the network node via the cable. In fact, in one embodiment, substantially all power consumed by the network node may be provided via the cable.

The network node may be referred to as a first network node and the cable may be referred to as a first cable. The handheld communications device may be connected to a second network node via a second cable. Providing the power to the network node may include the handheld communications device detecting power present on the second cable and enabling the detected power to flow from the second cable to the first network device via the first cable.

Alternatively, the providing of the power to the first network node may include detecting that power is not present on the second cable and the providing of the power to the first network node may include consuming energy stored by a battery of the handheld communications device. Furthermore, the first network node may be configured to send a stream of packets to the second network node and the method may further include the handheld communications device accessing information describing characteristics of the stream and the handheld communications device presenting the information to a user. In one embodiment, the handheld communications device may access the information by capturing and analyzing packets transmitted from the first network node to the second network node and/or packets transmitted from the second network node to the first network node.

Figure 2:
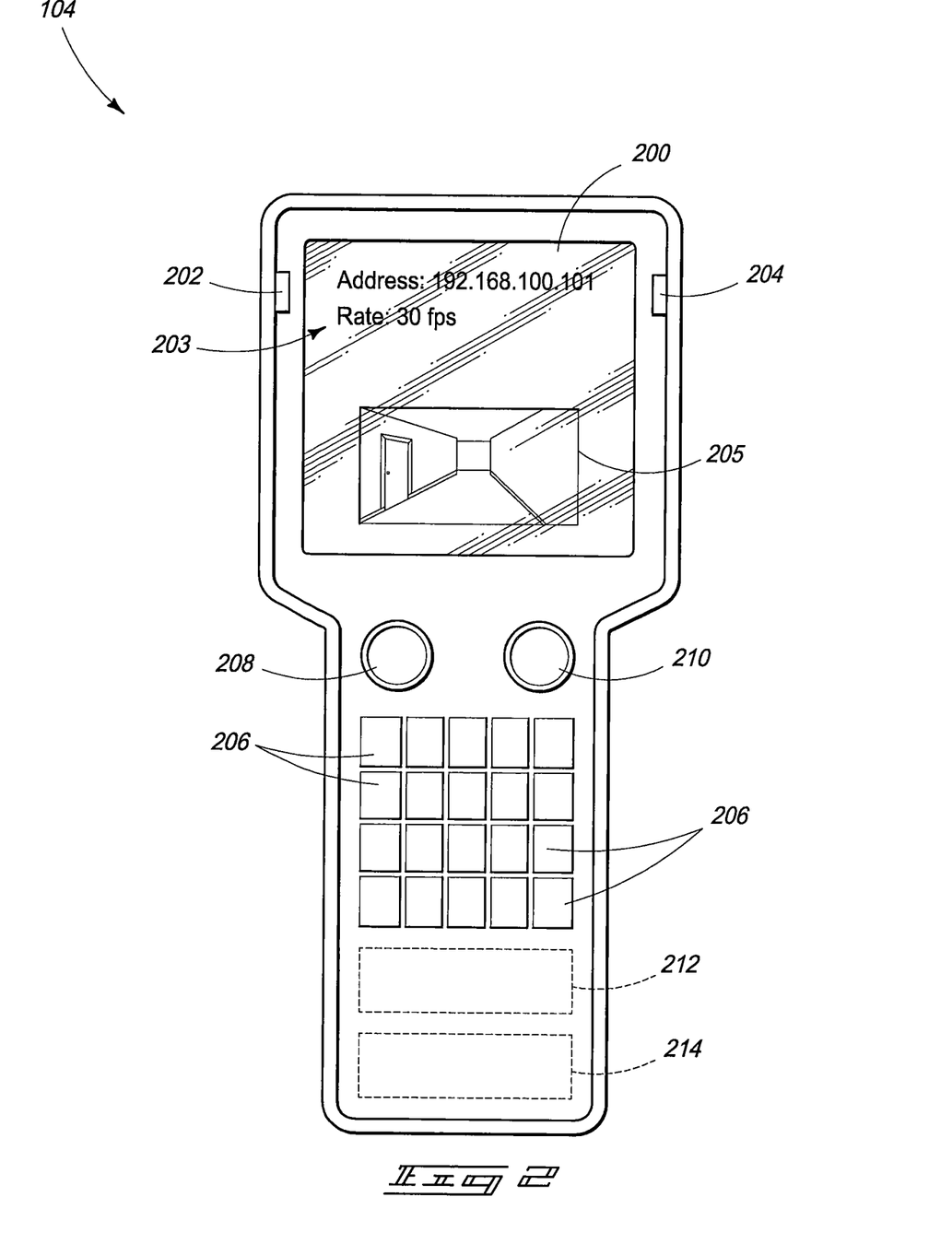
FIG. 2 illustrates a handheld communications device according to one embodiment.

Referring to FIG. 2, one embodiment of handheld communications device 104 is illustrated. Handheld communications device 104 includes a display 200, a communications port 202, another communications port 204, a button 208, another button 210, a keyboard 206, at least one battery 212, and at least one network address 214. Network address 214 may be an IP address that is part of an IP interface of handheld communications device 104. Handheld communications device 104 may include more, less, and/or alternative components in other embodiments.

Communications ports 202 and 204 may be Ethernet ports. More specifically, in one embodiment, communications ports 202 and 204 may include female RJ-45 receptacles to which cables terminated with male RJ-45 plugs may be connected. In some configurations, communication port 202 and/or communication port 204 may be configured to provide DC and/or AC power on one or more metallic contacts of communication port 202 so that DC and/or AC power may flow from communication port 202 through one end of a cable connected to communication port 202 to a network node connected to the other end of the cable that consumes the power. The metallic contacts used to provide the power may, in some embodiments, be used to simultaneously relay data packets such as Ethernet packets in addition to providing the power. Furthermore, the power may be present on the metallic lines in addition to electrical signals used to relay data packets that may also be present on the metallic contacts.

In one specific embodiment, communication port 202 and/or communications port 204 may provide power in accordance with one or more Power over Ethernet (PoE) standards such as IEEE 802.3-2008. In this embodiment, handheld communications device 104 may be referred to as power sourcing equipment and the network node may be referred to as a powered device.

Figure 3:
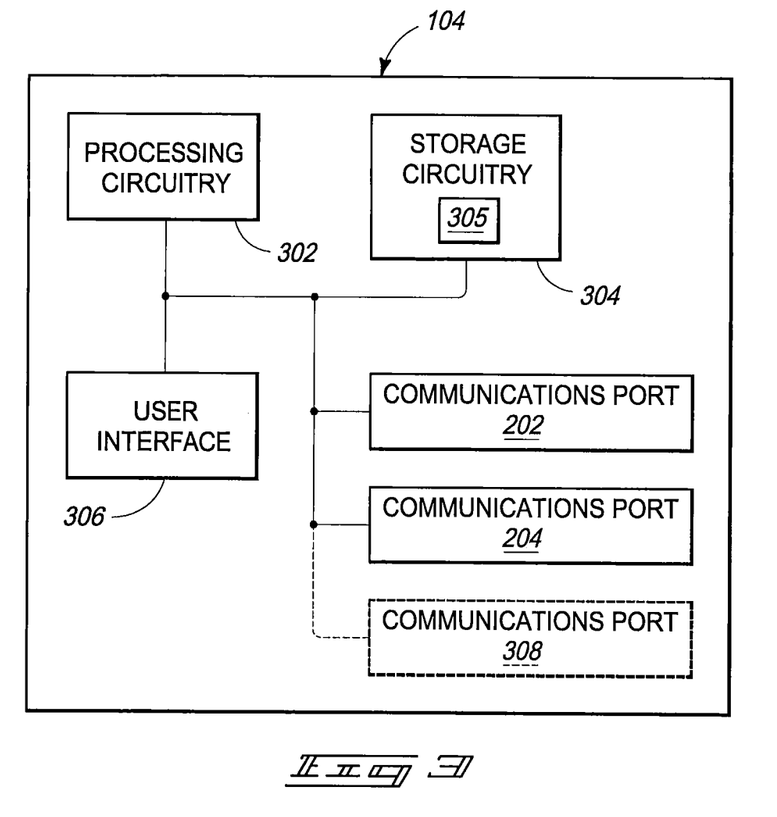
FIG. 3 is a block diagram of a handheld communications device according to one embodiment.

Referring to FIG. 3, a block diagram of handheld communications device 104 is illustrated. As is depicted, handheld communications device 104 may include processing circuitry 302, storage circuitry 304, and user interface 306. Communications ports 202 and 204 are also depicted, as is communications port 308, which may be present in some embodiments. Handheld communications device 104 may include more, less, and/or alternative components in other embodiments.

In one embodiment, processing circuitry 302 is arranged to process data, control data access and storage, issue commands, and control other desired operations. For example, processing circuitry 302 may be configured to verify operation of a network node such as IP camera 100 in one embodiment.

Processing circuitry 302 may comprise circuitry configured to implement desired programming provided by appropriate media in at least one embodiment. For example, processing circuitry 302 may be implemented as one or more of processor(s) and/or other structure configured to execute executable instructions including, for example, software and/or firmware instructions, and/or hardware circuitry. Exemplary embodiments of processing circuitry 302 include hardware logic, PGA, FPGA, ASIC, state machines, and/or other structures alone or in combination with a processor. These examples of processing circuitry 302 are for illustration and other configurations are possible.

Storage circuitry 304 is configured to store programming such as executable code or instructions (e.g., software and/or firmware), electronic data, databases, or other digital information and may include processor-usable media. For example, processing circuitry 302 may control storage circuitry 304 to store information accessed from port 202 and/or port 204 and/or user-inputted information in one embodiment.

Processor-usable media may be embodied in any computer program product(s) or article of manufacture(s) 305 which can contain, store, or maintain programming, data and/or digital information for use by, or in connection with, an instruction execution system including processing circuitry in the exemplary embodiment. For example, exemplary processor-usable media may include any one of physical media such as electronic, magnetic, optical, electromagnetic, infrared, or semiconductor media. Some more specific examples of processor-usable media include, but are not limited to, a portable magnetic computer diskette, such as a floppy diskette, ZIP® disk manufactured by the Iomega Corporation of San Diego, Calif., hard drive, random access memory, read only memory, flash memory, cache memory, and/or other configurations capable of storing programming, data, or other digital information.

At least some embodiments or aspects described herein may be implemented using programming stored within appropriate storage circuitry 304 described above and/or communicated via a network or other transmission media and configured to control appropriate processing circuitry. For example, programming may be provided via appropriate media including, for example, embodied within articles of manufacture. In another example, programming may be embodied within a data signal (e.g., modulated carrier wave, data packets, digital representations, etc.) communicated via an appropriate transmission medium, such as a communication network (e.g., the Internet and/or a private network), wired electrical connection, optical connection and/or electromagnetic energy, for example, via a communications interface, or provided using other appropriate communication structure. Exemplary programming including processor-usable code may be communicated as a data signal embodied in a carrier wave in but one example.

User interface 306 is configured to interact with a user including conveying data to a user (e.g., displaying data for observation by the user, audibly communicating data to a user, etc.) as well as receiving inputs from the user (e.g., tactile input, voice instruction, etc.). Accordingly, in one exemplary embodiment, user interface 306 may include display 200 configured to depict visual information and an audio system as well as keyboard 206, mouse and/or other input devices such as buttons 208 and 210. Any other suitable apparatus for interacting with a user may also be utilized.

Figure 4:
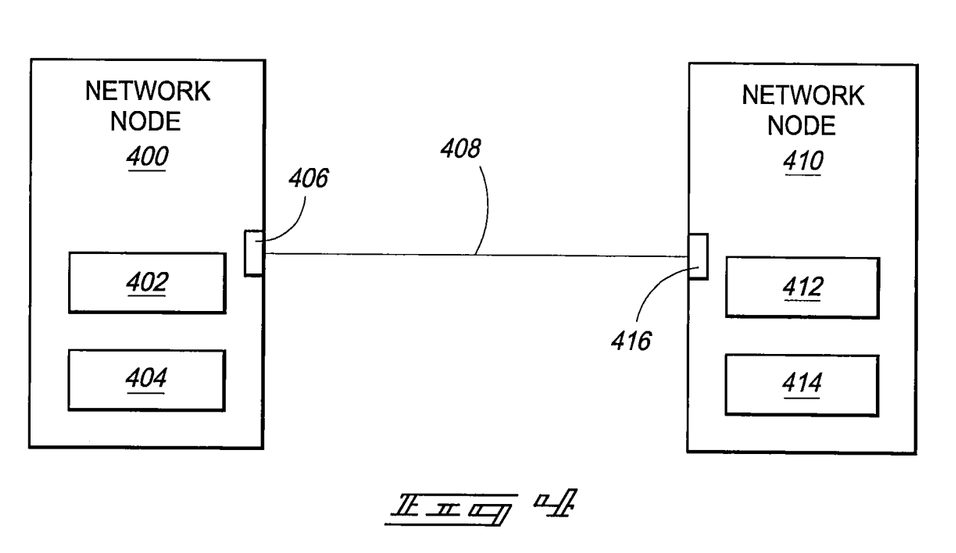
FIG. 4 is a block diagram of a communications network according to one embodiment.

Referring to FIG. 4, two network nodes 400 and 410 connected by cable 408 are illustrated. In one embodiment, network node 400 may be an IP camera such as IP camera 100 and network node 410 may be a switch, router, storage device, computer, or other device configured to send and receive data packets via cable 408. For example, node 410 may be a computer that an operator may use to view video captured by node 400.

Network node 400 includes port 406, network address 402, and may also include web server 404. Similarly, network node 410 includes port 416, network address 412, and may also include web server 414. Network addresses 402 and 412 may both be IP addresses.

Ports 406 and 416 may be Ethernet ports. More specifically, in one embodiment, communications ports 406 and 416 may include female RJ-45 receptacles to which cables terminated with male RJ-45 plugs may be connected.

In some configurations, communication port 416 may be configured to provide DC and/or AC power on one or more metallic lines of cable 408 so that DC and/or AC power may flow from communication port 416 through one end of cable 408 to port 406 of node 400. The metallic lines of cable 408 used to provide the power may, in some embodiments, be used to simultaneously relay data packets such as Ethernet packets in addition to providing the power.

In one specific embodiment, port 416 may provide power in accordance with a Power over Ethernet (PoE) standard such as IEEE 802.3-2008 to node 400 via cable 408. In this embodiment, node 410 may be referred to as power sourcing equipment and node 400 may be referred to as a powered device.

Furthermore, in some configurations, node 410 may be the primary or only source of power for node 400. Accordingly, substantially all of the power consumed by node 400 (e.g., in capturing video images) may be supplied by node 410. In some cases, node 400 may include one or more small batteries used to provide a small amount of power to particular subsystems of node 400 in the case of a power outage, but these batteries might not provide sufficient power to allow node 400 to operate fully. Hence, when node 400 is fully operational, substantially all of the power consumed by node 400 may be supplied by node 410 despite the presence of the small batteries.

Since cable 408 may be installed for communicating packets between nodes 400 and 410, it may be beneficial to provide power to node 400 via cable 408 rather than incurring additional expense associated with installing a separate power cable connecting node 400 to a power source other than node 410.

Figure 5:
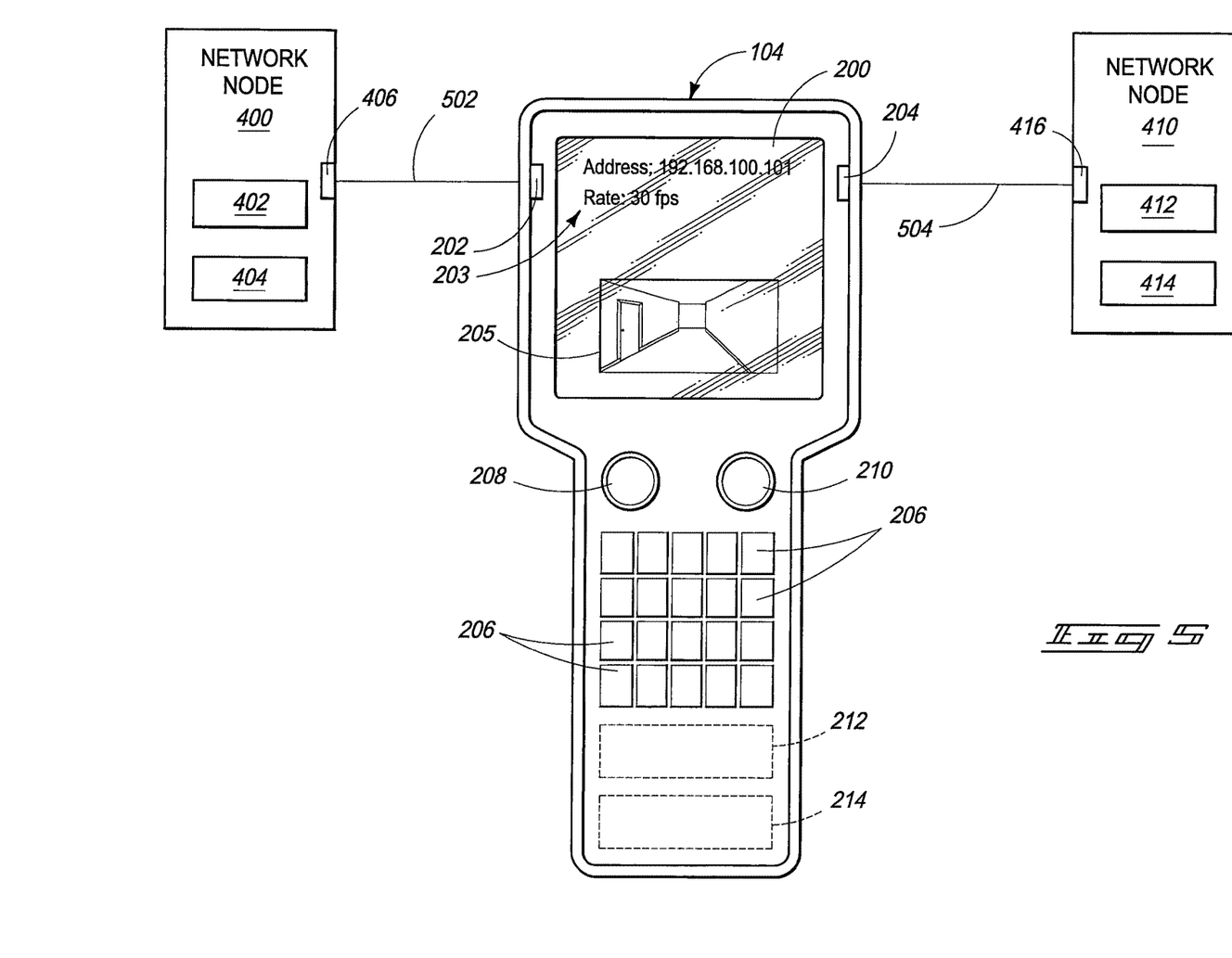
FIG. 5 is a block diagram of a communications network according to one embodiment.

Referring to FIG. 5, handheld communications device 104 (described above in relation to FIG. 2) is shown connected inline between node 400 and node 410 via cables 502 and 504. Other configurations are also possible. For example, handheld communications device 104 may be connected to node 400 via cable 502 but not to node 410 or handheld communications device 104 may be connected to node 410 via cable 504 but not to node 400.

A user may connect handheld communications device 104 to node 400 to determine whether node 400 is operational and/or to access information describing a configuration of node 400. To do so, handheld communications device 104 may need to know a network address (e.g., address 402) of node 400 to communicate with node 400. Handheld communications device 104 might not know or otherwise be aware of address 402.

Once handheld communications device 104 is connected to node 400, processing circuitry 302 (described above in relation to FIG. 3) may automatically learn address 402 of node 400. In one embodiment, processing circuitry 302 may automatically and without user intervention learn address 402 once handheld communications device 104 is connected to node 400.

In another embodiment, processing circuitry 302 may automatically learn address 402 once handheld communications device 104 is connected to node 400 and a user instructs processing circuitry 302 to learn address 402, for example, by simply pressing a button (e.g., button 210) or otherwise instructing processing circuitry 302 to automatically learn address 402. In this case, once the user instructs processing circuitry 302 to learn address 402, processing circuitry 302 may learn address 402 without any further user intervention subsequent to the instructing.

Automatically learning address 402 may be beneficial to a user of handheld communications device 104 since it may be difficult or impossible for the user to determine the address without handheld communications device 104 if the user is not familiar with data networks and the way that nodes of data networks communicate. Network nodes are commonly automatically assigned an address by a server rather than being manually configured with an address by a user. The automatically assigned address may change over time, especially if there is a power outage. Consequently, even if the user knew the value of address 402 at one point in time, the value of address 402 may be different at a later point in time. Accordingly, the ability of handheld communications device 104 to automatically learn address 402 may be very useful to the user.

Processing circuitry 302 may learn address 402 by receiving a packet from node 400 via port 202. The packet may include address 402 and processing circuitry 302 may extract address 402 from the packet.

In some cases, once processing circuitry 302 has learned address 402, processing circuitry 302 may modify a value of network address 214 of handheld communications device 104 so that address 402 and modified address 214 both belong to the same IP subnet if the value of address 214 prior to modification does not belong to the same subnet as address 402.

Once handheld communications device 104 has learned address 402, handheld communications device 104 may communicate with node 400. In one embodiment, a user may verify functionality or a configuration of node 400 using handheld communications device 104 by retrieving information from node 400. For example, processing circuitry 302 may retrieve information from web server 404 of node 400 and may display the retrieved information via user interface 306 (e.g., display 200). In one embodiment, handheld communications device 104 may include a web browser (e.g., INTERNET EXPLORER provided by Microsoft Corporation of Redmond, Wash.) and the retrieved information may be displayed by the web browser.

The retrieved information may include configuration information. For example, if node 400 is an IP video camera, the configuration information may describe a frame rate at which node 400 is capturing images; current pan, tilt, and zoom settings; a resolution which node 400 is configured to use in capturing images; a destination to which node 400 is configured to send packets containing video captured by node 400; a frame size to be used for packets transmitted by node 400; a subnet mask used by node 400; an video image size of images captured by node 400 (e.g., the number of vertical pixels of the image multiplied by the number of horizontal pixels of the image); and other configuration information. Sample configuration information retrieved by handheld communications device 104 from node 400 is illustrated on display 200 at 203 in FIGS. 2 and 5. In one embodiment, handheld communications device 104 may retrieve the sample configuration information directly from node 400. In another embodiment, handheld communications device 104 may acquire the sample configuration information by analyzing packets transmitted by node 400.

The information may also include data captured by node 400. For example, if node 400 is an IP video camera, the information may include video images captured by node 400. FIGS. 2 and 5 illustrate such data as an image 205 displayed by display 200. Image 205 may be a static image or may be a video image that changes over time. A user may review the information retrieved from node 400 to determine whether node 400 is operational. For example, if node 400 is an IP video camera and an image retrieved from node 400 is all black or otherwise does not represent what should be captured by the IP video camera, the user may determine that node 400 is not operational. Similarly, the user may review configuration information and determine that node 400 is not operational because it is misconfigured.

In one embodiment, the configuration information and/or data captured by node 400 may be retrieved in response to a user pressing button 208. Button 208 may provide a convenient way for the user to capture a snapshot of information describing the configuration of node 400 that does not involve the user having to manually open a web browser window and then navigate through one or more screens of configuration information provided by web server 404 to retrieve the configuration information.

Processing circuitry 302 may similarly automatically determine address 412 of node 410 and may use address 412 to retrieve information (e.g., information describing a configuration of node 410 and data captured by node 410) from node 410. In one embodiment, handheld communications device 104 may form first data packets having address 214 and send the first data packets to node 400 via port 202 and may form second data packets also having address 214 and send the second data packets to node 410 via port 204. Accordingly, address 214 may be a source address for both packets transmitted by port 202 and packets transmitted by port 204

As was discussed above, node 410 may provide power to node 400 via cable 408 in the arrangement illustrated in FIG. 4 in addition to using cable 408 to communicate data packets. With respect to FIG. 5, handheld communications device 104 may detect whether node 410 is providing power via port 416 and cable 504 by determining whether power is present on cable 504. If power is present, handheld communications device 104 may pass the power through from port 204 to port 202. The power may then flow from port 202 to node 400 and node 400 may consume the power.

Alternatively, if power is not present on cable 504, handheld communications device 104 may consume energy stored by battery 212 to put power on port 202. The power may flow from port 202 through cable 502 to node 400 and node 400 may consume the power. Note that although power might not be present on cable 504, signals related to data packet communications may be present on cable 504. Accordingly, handheld communications device 104 may be battery-operated power-sourcing equipment. Handheld communications device 104 may similarly provide power to node 400 via port 202 and cable 502 if handheld communications device 104 is not connected to node 410.

In one configuration, node 400 may be installed, but node 410 might not yet be installed. Since node 410 is not yet installed or is not yet operational, node 400 might not be operational either since node 400 may depend on node 410 for power. In this configuration, the ability of handheld communications device 104 to provide power to node 400 may be useful since handheld communications device 104 may consume energy stored by battery 212 to power node 400 even though node 410 is not yet installed. In this manner, a user may verify that node 400 is operational and properly configured even though node 410 is not operational.

In another configuration, handheld communications device 104 may be connected to both node 400 and node 410 as illustrated in FIG. 5. In this configuration, node 400 may send a stream of packets to node 410. For example, node 400 may be an IP video camera configured to send a stream of packets containing video to node 410. Handheld communications device 104 may receive the stream of packets on port 202 and pass the stream of packets through to port 204 so that node 410 receives the stream of packets. Similarly, handheld communications device 104 may receive packets on port 204 transmitted by node 410 and addressed to node 400 and may forward the received packets to node 400 via port 202.

Handheld communications device 104 may analyze the stream of packets sent from node 400 to node 410, may access information describing characteristics of the stream, and may present the information to a user via display 200. For example, handheld communications device 104 may determine or otherwise access information such as current network bandwidth consumed by the stream of packets, average network bandwidth consumed by the stream of packets, images per second conveyed by the stream of packets, image size of images conveyed by the stream of packets, and a video compression scheme used for video conveyed by the stream of packets.

According to another aspect of the invention, a communications method includes using a handheld communications device connected to a network node to: automatically determine a network address of the network node; communicate with the network node using the determined network address; retrieve information describing a configuration of the network node from the network node; and present the retrieved information to a user.

The information may be referred to as first information and the configuration may be referred to as a first configuration of the network node. The method may further include comparing the first information with second information describing a second configuration of the network node and identifying differences between the first configuration and the second configuration. The first configuration of the network node may be associated with a first moment in time and the second configuration of the network node may be associated with a second moment in time.

The method may further include after the comparing of the first information with the second information, providing the second information to the network node and instructing the network node to adopt the second configuration using the second information.

The network node may be an IP camera and the information may describe a rate at which the IP camera transmits frames of video captured by the IP camera.

Returning to FIG. 5, handheld communications device 104 may be used to identify misconfigurations of node 400 or node 410. For example, a user may determine that node 400 is no longer operational or operates in an undesirable way (e.g., node 400 may be an IP video camera generating a video stream with poor quality). In response, the user may connect handheld communications device 104 to node 400. Once connected, handheld communications device 104 may retrieve configuration information from node 400, for example, by retrieving the configuration information from web server 404.

Figure 6:
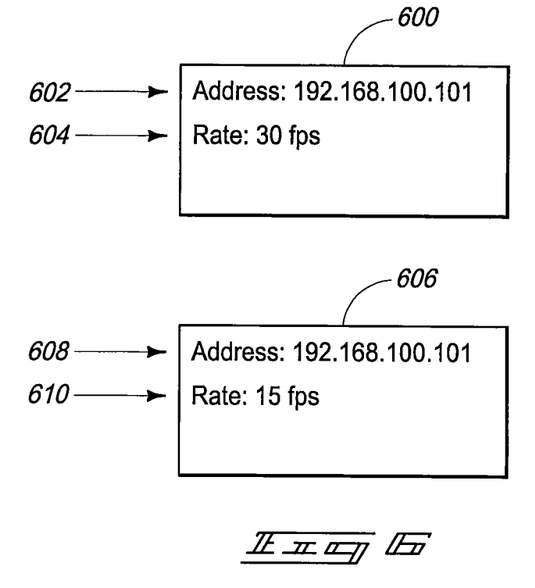
FIG. 6 is an illustration of configuration information according to one embodiment.

Referring to FIG. 6, a chart 606 illustrates an example of information retrieved from node 400. Of course, chart 606 could include additional information retrieved from node 400. Two items are illustrated for simplicity. The retrieved information includes a value 608 of network address 402 as well as a value 610 of a video frame rate used by node 400.

Handheld communications device 104 may also retrieve previously stored configuration information for node 400. The previously stored configuration information may be configuration information representing a configuration of node 400 at a prior moment in time (e.g., at the time of installation of node 400). The previously stored configuration information may be stored on handheld communications device 104 (e.g., in storage circuitry 304) or may be stored on another device in communication with handheld communications device 104. In one configuration, handheld communications device 104 may include circuitry (e.g., port 308 of FIG. 3) configured to wirelessly communicate with a network to which the device storing the previously stored configuration information is connected.

Chart 600 illustrates an example of previously stored configuration information for node 400. The previously stored information includes a value 602 of network address 402 as well as a value 604 of a video frame rate used by node 400. Handheld communications device 104 may identify differences between the retrieved information (illustrated in chart 606) and the previously stored information (illustrated in chart 600). In particular, handheld communications device 104 may identify that the value of the frame rate has changed from 40 frames per second (fps) to 15 fps. Handheld communications device 104 may additional identify that network address 402 is the same in both chart 600 and chart 606.

In one embodiment, handheld communications device 104 may configure node 400 with the previously stored configuration information in response to input from a user. In this manner, the user may easily restore node 400 to an original configuration (e.g., the configuration represented by the previously stored configuration information). In one embodiment, the user may provide a single instruction to handheld communications device 104 and in response handheld communications device 104 may automatically and without further user input configure node 400 with the previously stored configuration. In another embodiment, the user may use handheld communications device 104 to manually configure node 400 with the previously stored configuration information.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A communications method comprising:
   using a single cable to directly couple a first communications port of a handheld communications device to a second communications port of a network node;
   receiving by the handheld communications device from the network node via the single cable a packet;
   extracting by the handheld communications device from the received packet a network address of the network node;
   automatically determining by the handheld communications device if a current network address of the handheld communications device and the network address of the network node extracted from the received packet both belong to a same IP subnet;
   when it is determined that a current network address of the handheld communications device and the network address of the network node extracted from the received packet do not both belong to the same IP subnet, causing the handheld communications device to use the network address of the network node extracted from the received packet to automatically modify the current network address of the handheld communications device whereby the modified network address of the handheld communications device and the network address of the network node extracted from the received packet belong to the same IP subnet such that the network node and the handheld device are capable of directly exchanging information via the single cable; and after the handheld communications device and the network node are determined to be capable of directly exchanging information via the single cable, causing the handheld communications device to send information to the network node and retrieve information from the network node via the single cable;

wherein the network node comprises an IP camera or an IP telephone.

2. The method as recited in claim 1, further comprising providing power from the handheld communication device to the network node via the single cable.

* * * * *